Patented Nov. 12, 1940

2,221,692

UNITED STATES PATENT OFFICE 2,221,692

SEPARATION PROCESS

Kenneth C. D. Hickman and James G. Baxter, Rochester, N. Y., assignors to Distillation Products Inc., Rochester, N. Y., a corporation of Delaware No Drawing. Application October 15, 1938, Serial No. 235,239

5 Claims. (Cl. 202—52)

This invention relates to the preparation of distillates by vacuum distillation which distillates have an improved resistance to oxidation. The invention relates in particular to the preparation of vitamin distillates which have increased resistance to oxidation during storage. The invention also relates to such improved vacuum distillation products.

The preparation of substances in concentrated or more or less pure form by high vacuum, unobstructed path and particularly molecular, distillation is well known. In many cases this distillation procedure is applied to the purification of substances which are rather easily oxidized. For instance, it has been proposed to concentrate fat soluble vitamins contained in various vegetable and animal oils by subjecting them to distillation and separating a concentrate of the vitamin as a distillate. In many cases such distillates are quite easily oxidized due to the rather extremely low resistance to oxidation of the vitamin constituents. Not only do these substances lose their therapeutic potency during storage but slight losses also take place due to oxidation during distillation.

This invention has for its object to provide a process by which the above difficulties are avoided. Another object is to provide an improved distillation process whereby distillates having increased resistance to oxidation can be prepared in a simple and economical manner. Another object is to provide improved high vacuum distillates containing oxidizable constituents in stabilized form. Other objects will become apparent from the following description and claims.

These and other objects are accomplished in accordance with our invention which includes adding to the distilland which contains the oxidizable constituents which are to be concentrated by high vacuum distillation, a vegetable or animal oil which contains a natural protective substance which distills at approximately the same temperature as the oxidizable constituent.

We have found that natural vegetable and animal oils contain protective substances which will, when added to materials having a tendency to become oxidized, protect them against oxidation. We have further found that these natural protective substances are distillable under high vacuum, unobstructed path conditions and will distill simultaneously with the oxidizable fractions. Although oils of these types as a class contain protective substances, they are present in varying amounts depending upon their source, season of expression or extraction, etc. The vegetable oils have been found to be by far the richest source of these protective agents. Examples of oils found to be particularly rich in protective substances are corn oil, cottonseed, wheat germ, soy bean, apricot kernel, and other seed or kernel oils.

The addition of relatively small amounts of oils of this class to the distilland prior to distillation results in a distillate which contains the oxidizable constituent in concentrated form and also protective amounts of these protective substances. The amounts of the oil containing the protective substance employed can be varied materially but will usually range from about 1–25%. Larger or smaller amounts may be desirable in particular cases and such amounts are to be understood as being within the scope of my invention.

*Example*

A sample of raw pollack oil was distilled under molecular distillation conditions to give eight fractions whose distillation data is given in the following table. Another sample of the same pollack oil containing 10 per cent crude corn oil was similarly distilled to give as closely as possible the same per cent cuts. Three gram samples of each of the sixteen fractions were assayed for vitamin A potency and then stored while exposed to air at 37° C. for 113 hours. They were then reassayed.

The per cent of the original vitamin A potency present in each sample at the end of 113 hours is recorded below.

Crude pollack oil

| Fraction number | Distillation temp. | Per cent cut taken | Initial vitamin A potency | Per cent original vitamin A potency after 113 hrs. at 37° C. |
|---|---|---|---|---|
| 1 | 220 | 1.09 | 356,000 | 65 |
| 2 | 232 | 1.20 | 370,000 | 35 |
| 3 | 233 | 1.29 | 260,000 | 19 |
| 4 | 236 | 1.37 | 180,000 | 6.3 |
| 5 | 238 | 1.25 | 111,000 | 4.7 |
| 6 | 240 | 1.26 | 90,000 | 4.3 |
| 7 | 241 | 1.29 | 45,200 | 5.3 |
| 8 | 241 | 1.25 | 33,800 | 6.7 |

Crude pollack oil plus 10% crude corn oil

| Fraction number | Distillation temp. | Per cent cut taken | Initial vitamin A potency | Per cent original vitamin A potency after 113 hrs. at 37° C. |
|---|---|---|---|---|
| 1 | 220 | 1.27 | 336,000 | 92.5 |
| 2 | 223 | 1.29 | 259,000 | 96.5 |
| 3 | 225 | 1.25 | 223,000 | 97.0 |
| 4 | 228 | 1.35 | 173,000 | 98.0 |
| 5 | 231 | 1.18 | 133,000 | 95.0 |
| 6 | 233 | 1.33 | 79,000 | 95.0 |
| 7 | 234 | 1.37 | 51,800 | 76.0 |
| 8 | 236 | 1.30 | 34,200 | 28.0 |

It is apparent from the data presented that the antioxidant present in crude corn oil distills in the same region as vitamin A and provides excellent protection for it. Not until the vitamin A potency of the fractions has fallen below 33,000 units does the amount of corn oil anti-oxidant distilled with the fraction become too small to confer adequate protection.

We prefer to employ oils containing protective substances which are in their raw, unrefined state or which have been subjected to a refining treatment which does not destroy the protective substances. Most mild purification treatments, such as washing with water, treatment with bleaching or adsorption earths, mild, low temperature alkali treatment, etc., do not harmfully affect the anti-oxidant properties. Strong refining treatments, such as the ordinary alkali or mineral acid refining procedure, more or less completely destroy the protective substance and, therefore, should not be applied to oils which are to be used for this purpose.

The procedure of the invention is carried out under high vacuum, unobstructed path distillation conditions, i. e., under conditions such that the distilling and condensing surfaces are separated by substantially unobstructed space and a high vacuum exists therebetween. The distance between the two surfaces should preferably be short in which case the distillation is of the type heretofore known as high vacuum, short path distillation. When the distance between the two surfaces is less than about the mean free path, the distillation contemplated is known as molecular distillation. These distillations are all of the same general nature and are contemplated as being included within the procedure of our invention. The pressure intended when the term "high vacuum" is employed is any pressure below 1 mm. Pressures below .1 mm., such as .01–.001 mm., are usually employed and are preferred since they permit better distillation with less decomposition. Obviously the lower the pressure the better will be the distillation. However, for all general purposes pressures within the range indicated are completely satisfactory.

The procedure of the invention is of particular value in connection with the preparation of distillates intended for use as foods or medicines. Heretofore considerable doubt has been entertained as to the safety of adding anti-oxidants, such as hydroquinone, to edible substances. By the present invention a natural anti-oxidant naturally present is an ordinary edible oil and, therefore, without question a safe edible substance, is incorporated with the material which is to be used as an animal food, or medicine. Therefore, there can be no question as to the safety of these products.

When subjecting crude oils to high vacuum distillation in order to separate the protective substance as a pure material difficulty has been encountered due to the fact that the raw oils tend to deposit insoluble materials on the vaporizing surface of the still. When they are added to the oil in the manner described, these raw oils are substantially diluted and it has been found that this tendency to clog the distillation surface is not present with the oils in the low dilutions described. Therefore, the invention has the decided advantage that two substances can be concentrated simultaneously and that the problem of clogging is substantially avoided.

When oxidizable substances are distilled in the ordinary way, distillates are obtained which are initially bland and odorless, but which regenerate odor and taste in a few minutes after contact with the air. This oxidation which apparently takes place very rapidly is prevented by the invention since the distillates obtained are in the presence of the protective substance from the very moment of their formation. For this reason products produced by the invention have immensely superior qualities particularly in respect to keeping properties, odor and taste.

It is known to prepare distillates of highly unsaturated oils such as linseed, perilla, walnut and oiticica oils. Due to the high degre of unsaturation these distillates oxidize rapidly. Therefore the invention can be applied to the preparation of these materials with particular advantages.

Various edible oils such as lard and salad oils can be purified and improved by high vacuum distillation. By applying our invention to these classes of substances we are able to obtain products which have superior qualities, especially from the standpoint of odor, taste and resistance to oxidation.

The invention is of great advantage in the preparation of oxidizable pharmaceuticals, such as vitamin A, D, E, and/or K, concentrates, by distillation of oils such as halibut liver, salmon, sardine, cod-liver, gray fish liver, pollock liver, soy bean and wheat germ oils.

In Hickman Patent 2,150,683, March 14, 1939, which was copending herewith, there is described the distillation of vitamins and other easily oxidized substances from oils while in the presence of a volatilizable antioxidant, such as hydroquinone.

What we claim is:

1. The process of transferring a natural antioxidant substance contained in a natural glyceride oil to a valuable material which is contained in a distillable mixture which is easily oxidized, which process comprises adding the natural glyceride oil which contains the natural protective antioxidant substance to the distillable mixture, subjecting the resultant mixture to high vacuum, unobstructed path distillation, condensing a distillation fraction which contains both the valuable oxidizable constituent and the protective antioxidant material contained in the natural oil, both being present in the distillation fraction in concentrated condition.

2. The process for preparing a fat soluble vitamin concentrate containing a natural substance which protects it against oxidation, which process comprises adding to a crude oil which contains a vitamin, a natural glyceride oil which contains a natural protective antioxidant substance, subjecting this mixture to high vacuum short path distillation and separating a fraction containing the vitamin and the protective antioxidant substance, both the vitamin and the natural protective substance being present in the fraction in concentrated form.

3. The process for preparing a vitamin concentrate which is resistant to oxidation which process comprises adding to a fish oil which contains a vitamin, a natural vegetable oil which contains a natural antioxidant substance, subjecting this mixture to high vacuum, unobstructed path distillation and condensing a fraction which contains the vitamin mixed with the natural antioxidant substance.

4. The process for preparing a vitamin A concentrate which is resistant to oxidation which process comprises adding corn oil which contains a natural antioxidant substance to a fish oil which contains vitamin A, subjecting this mixture to molecular distillation and condensing a fraction which contains a mixture of the vitamin A and the protective antioxidant substance of the corn oil, the vitamin A and the protective substance being present in the fraction in concentrated form.

5. The process of distilling a relatively easily oxidizable substance under high vacuum conditions which process comprises adding to the oxidizable substance a natural vegetable oil which contains a natural protective antioxidant agent, subjecting this mixture to high vacuum, short path distillation and condensing a distillation fraction which contains both the oxidizable substances and the natural protective antioxidant agent in concentrated condition.

KENNETH C. D. HICKMAN.
JAMES G. BAXTER.